3,167,598
CHLORINATED VINYL CHLORIDE POLYMERS
ADMIXED WITH GRAFT COPOLYMERS
John Michael Heaps and John Edward Bramfitt, Colchester, Essex, England, assignors to B.X. Plastics Limited, London, England
No Drawing. Filed Dec. 18, 1961, Ser. No. 160,312
8 Claims. (Cl. 260—876)

The present invention is concerned with blends containing chlorinated polymers, more especially polymers and copolymers that are derived from vinyl chloride.

It is well known that the usefulness of articles such as water pipe fabricated from polyvinyl chloride is limited by the fact that the polyvinyl chloride has a softening point that is below the temperatures of boiling or nearly boiling water. It has been proposed to increase the softening point of polyvinyl chloride by certain processes of chlorinating the polyvinyl chloride so that articles made from this chlorinated material have a potentially wider range of application than those made from unmodified polyvinyl chloride. These chlorinated polyvinyl chlorides, however, can be more difficult to process than nonchlorinated polyvinyl chloride. Moreover, the impact strength of these chlorinated polyvinyl chloride materials is of the same order as that of polyvinyl chloride itself so that for certain applications the brittleness of rigid articles fabricated from chlorinated polyvinyl chloride constitutes a disadvantage.

The present invention is based on the observation that by blending with such a chlorinated polyvinyl chloride material a graft copolymer derived from polyvinyl chloride and/or a vinyl chloride copolymer and one or more ethylenically unsaturated monomers, products can be obtained which are easier to process than, and have superior impact strengths to, the chlorinated polyvinyl chloride itself while retaining to a substantial extent the high softening point of the latter material. Instead of or in addition to the chlorinated polyvinyl chloride there may be used a chlorinated vinyl chloride copolymer.

The present invention thus provides a blend comprising (1) a chlorinated polyvinyl chloride and/or a chlorinated vinyl chloride copolymer and (2) a graft copolymer from polyvinyl chloride and/or a vinyl chloride copolymer and one or more ethylenically unsaturated monomers. Advantageously the weight of the graft copolymer (2) is less than or equal to the weight of the chlorinated component (1).

The graft copolymer (2) is advantageously polyvinyl chloride or a vinyl chloride copolymer that has been grafted with one or more ethylenically unsaturated monomers to give a product of greater mechanical flexibility. There may be mentioned, for example, the graft copolymers which are prepared by grafting a conjugated diolefine, for example, butadiene, and at least one copolymerisable vinyl monomer, for example, acrylonitrile or ethyl acrylate, on to a halogen-containing trunk polymer prepared by a preliminary operation, for example, emulsion or suspension polymerised polyvinyl chloride. The ratio of the components in the graft copolymers is not critical, but the weight of the monomers polymerised in the grafting operation is preferably in the range of 20 to 70 percent by weight of the graft copolymer product. Such graft copolymers may be, for example, polyvinyl chloride grafted with butadiene and acrylonitrile, polyvinyl chloride grafted with chloroprene and ethyl acrylate or polyvinyl chloride grafted with butadiene and methyl methacrylate, or polyvinyl chloride or copolymer of vinyl chloride grafted with butadiene and methyl methacrylate with, or without, a third monomer, for example, styrene.

The graft copolymer component (2) may be prepared by grafting the mononer or monomers onto the polyvinyl chloride or vinyl chloride copolymer trunk polymer by means of high energy ionising radiation, or by chemical methods or by means of ultra-violet radiation, in the presence of a sensitiser.

By "ionising radiation" is to be understood radiation which is capable of producing ions in air under normal atmospheric conditions, which ions can be detected by their charge. As such radiation there comes into consideration for example, β-rays, accelerated electrons, thermal neutrons, accelerated deutrons and protons, X-rays or more especially gamma-rays. There may be used, for example, as sources of such radiation atomic piles, electron or particle accelerators, radioactive isotopes and X-ray equipment.

As chemical methods for effecting the graft polymerisation there may be mentioned free radical initiation using, for example, a peroxidic compound, especially a water-soluble mineral peroxidic compound, or a system containing such a compound, for example, a persulphate/metabisulphite system, with a complexing agent for heavy metals added prior to grafting.

The chlorinated polyvinyl chloride or chlorinated vinyl chloride copolymer component (1) of the blends of the present invention is preferably polyvinyl chloride or a vinyl chloride copolymer which has been further chlorinated in suspension under the influence of ultraviolet irradiation, to give a product having a chlorine content in the range of 55 to 70 percent by weight and containing only a minor proportion of 1:1-dichloroethylene units based on the total weight of dichloroethylene units present.

As vinyl chloride copolymers from which the chlorinated component (1) and the graft component (2) of the present blends may be derived, there may be used copolymers of vinyl chloride with a copolymerisable monomer, for example, vinylidene chloride or especially vinyl acetate, preferably those in which the vinyl chloride constitutes over 80 percent by weight of the monomer mixture. In the case of the chlorinated copolymers (1) the vinyl chloride advantageously constitutes at least 95 percent by weight of the monomer mixture.

The blends of the present invention may also contain the usual proportions of, for example, plasticisers, thermal and light stabilisers, antioxidants, lubricants, fillers, pigments, colourants and processing aids other than the graft copolymers used as the component (2).

The blending can be carried out at elevated temperatures, for example, 150–200° C. using, for example, a mill, an internal mixer, for example, a Banbury mixer, or an extruder which is efficient in mixing polymeric materials. The blends may also be compounded by mixing the chlorinated polyvinyl chloride or vinyl chloride copolymer in suspension or emulsion form with a suspension or emulsion of the graft copolymer, the whole blend then being spray dried or coagulated together and dried and finally worked, for example, in a Banbury mixer.

The blends of this invention can be handled in conventional ways, for instance, compression moulding, injection moulding, calendering and extrusion, and the products so obtained can be transparent.

The following examples illustrate the invention, the parts being by weight unless otherwise stated:

Examples 1 and 2

In separate experiments the following ingredients were premixed in a dough type mixer.

| Example No. | 1 | 2 | Control |
|---|---|---|---|
|  | Parts | Parts | Parts |
| Chlorinated polyvinyl chloride | 100 | 100 | 100 |
| Polyvinyl chloride graft copolymer | 15 | 30 | -------- |
| Organo-tin stabiliser | 3 | 3 | 3 |
| Lubricating wax | 0.5 | 0.5 | 0.5 |

In each of these experiments the chlorinated polyvinyl chloride was polyvinyl chloride further chlorinated in suspension to give a product having a specific gravity at 23° C. of 1.560. The polyvinyl chloride graft copolymer was synthesised from polyvinyl chloride, butadiene and acrylonitrile in the relative proportions of 5:4:1, organo-tin stabilizer was Mellite 139, and the lubricating wax was Wax OP, a variety of Montan wax used in thermoplastic processing.

Each of the respective premixes was fluxed on a close set two roll mill (the surface temperatures of the rolls being given in the table below) and a uniform blend was produced by working on the rolls for about 5 minutes. After working the blends were removed from the rolls in the form of sheets which were compression moulded in standard test moulds for 5 minutes at 180° C. under pressure. After cooling in the mould, the moulded stock was machined to the required tolerance to give samples suitable for testing. The Charpy notched impact strength was determined for each sample according to the method described in "British Plastics," April 1959, page 158, and the softening point determinations according to British Standard 2782 part I, 1956, method 102 c. The following table gives the results obtained in these tests and the processing temperatures used:

| Example No. | 1 | 2 | Control |
|---|---|---|---|
| Mill Temperature: |  |  |  |
| Front roll (° C.) | 185 | 175 | 190 |
| Back roll (° C.) | 190 | 180 | 195 |
| Charpy Impact Strength, foot pounds/inch notch | 2.95 | 3.00 | 0.25 |
| Softening Point, ° C | 110 | 106.5 | 118 |

It was noticed that the addition of the graft copolymer to the chlorinated polyvinyl chloride facilitated processing on the mill. Thus the blend produced as described in Example 2 could be processed more easily and at lower temperatures than in the control experiment. The blend produced as described in Example 1 was intermediate in processability between Example 2 and the control. It was also observed that the compression moulded test specimens had a transparency which was only slightly inferior to that observed in compression mouldings of the control blend.

Example 3

Two separate experiments were carried out using the formulations given below:

| Example No. | 3 | Control |
|---|---|---|
|  | Parts | Parts |
| Chlorinated polyvinyl chloride | 100 | 100 |
| Polyvinyl chloride graft copolymer | 50 | -------- |
| Organo-tin stabiliser | 2 | 2 |
| Lubricating Wax | 0.5 | 0.5 |

In both experiments the chlorinated polyvinyl chloride was polyvinyl chloride further chlorinated in suspension to give a product having a specific gravity at 23° C. of 1.560. The polyvinyl chloride graft copolymer was synthesised from polyvinyl chloride, butadiene, and methyl methacrylate in the relative proportions by weight of 5:1:1, the organo-tin stabiliser was di-butyl tin maleate and the lubricating was Wax OP.

Each of the premixes was dry blended in a high-speed mixer, fluxed on a closely-set two-roll mill and test specimens were prepared in the same manner as Examples 1 and 2. The table below gives the test results and the processing temperatures:

| Example No. | 3 | Control |
|---|---|---|
| Mill Temperatures: |  |  |
| Front roll (° C.) | 180 | 180 |
| Back roll (° C.) | 185 | 185 |
| Charpy Impact Strength (foot pounds/inch notch) | 1.0 | 0.25 |
| Softening Point (° C.) | 100.5 | 117 |

It was noticed that the addition of the graft copolymer to the chlorinated polyvinyl chloride facilitated processing on the mill, at the temperature shown, to a marked extent. The blend described in Example 3 gelled immediately on contact with the mill rolls giving a smoothly textured sheet whereas the unmodified chlorinated polyvinyl chloride took approximately 2 minutes to form a coherent blend.

Example 4

100 parts of a chlorinated polyvinyl chloride, 3 parts of a sulphur-containing organo-tin compound (Mellite 139), 0.5 part of Wax OP and 20 parts of a polyvinyl graft copolymer synthesised from polyvinyl chloride, butadiene and acrylonitrile in the relative proportions 5:4:1 were blended in a dough type mixer. The blend was fluxed on a two roll mill, the surface temperature of one roll being 180° C. and of the other 185° C., a uniform blend being produced by working on the rolls for about 5 minutes. After working the sheet was removed from the rolls and allowed to cool.

In a control experiment a similar blend but without the addition of the graft copolymer was processed under the same conditions. It was noticed that the blend containing the graft copolymer banded more quickly on the mill and could be worked with greater ease than the control blend.

Each of the two milled sheets (Example and Control) obtained above was compression moulded in standard test moulds for 5 minutes at 180° C. under pressure. After cooling in the mould the moulded stock was machined to the required tolerance to give samples suitable for testing. The Charpy notched impact strength was determined for each sample according to the method described in "British Plastics," April 1959, page 158. The following results were obtained on these compression mouldings:

|  | Control | Example |
|---|---|---|
| Charpy Impact Strength (foot pounds/inch notch) | 0.25 | 2.23 |
| Tensile Strength (pounds/square inch) | 11,150 | 8,330 |
| Softening Point (° C.) | 117 | 108.5 |

The softening point determination was conducted according to British Standard, 2782, Part I, 1956: Method 102 C.

We claim:

1. A polymer blend comprising a homogeneous mixture of (1) a chlorinated polymer selected from the group consisting of chlorinated polyvinyl chloride, and chlorinated copolymers of vinyl chloride with vinyl acetate, the vinyl chloride constituting at least 95% by weight of the monomer mixture, and (2) a graft copolymer obtained by graft copolymerising a conjugated diolefine and at least one monomer selected from the group consisting of ethyl acrylate, methyl methacrylate, styrene and acrylonitrile onto a polymer selected from the group consisting of polyvinyl chloride and copolymers of vinyl chloride with vinyl acetate, the vinyl chloride constituting over 80% by weight of the monomer mixture, the chlorinated polymer (1) constituting at least 50% by weight of the total weight of the components (1) and (2).

2. A polymer blend comprising a homogeneous mixture of a chlorinated polymer selected from the group consisting of chlorinated polyvinyl chloride and chlorinated copolymers of vinyl chloride with vinyl acetate, the vinyl chloride constituting at least 95% by weight of the monomer mixture, which chlorinated polymer has a chlorine content within the range of 55 and 70% by weight and contains only a minor proportion of 1:1-dichloroethylene units based on the total weight of dichloroethylene units present, and (2) a graft copolymer obtained by graft copolymerising a conjugated diolefine and at least one monomer selected from the group consisting of ethyl acrylate, methyl methacrylate, styrene and acrylonitrile onto polyvinyl chloride.

3. A polymer blend comprising a homogeneous mixture of (1) polyvinyl chloride which has been further chlorinated in suspension under the influence of ultra-violet irradiation to give a product having a chlorine content in the range of 55 to 70% by weight and containing only a minor proportion of 1:1-dichloroethylene units based on the total weight of dichloroethylene units present and (2) polyvinyl chloride onto which has been grafted a conjugated diolefine and at least one monomer selected from the group consisting of ethyl acrylate, methyl methacrylate, styrene and acrylonitrile, the component (1) constituting at least 50% by weight based on the total weight of the components (1) and (2).

4. A polymer blend as claimed in claim 3 wherein the graft copolymer (2) is a graft copolymer selected from the group consisting of polyvinyl chloride grafted with butadiene and acrylonitrile, polyvinyl chloride grafted with chloroprene and ethyl acrylate, polyvinyl chloride grafted with butadiene and ethyl acrylate, and polyvinyl chloride grafted with butadiene and methyl methacrylate.

5. A polymer blend as claimed in claim 3, wherein the total weight of the grafted conjugated diolefine and the grafted monomer selected from the group consisting of ethyl acrylate, methyl methacrylate, styrene and acrylonitrile is from 20 to 70% calculated on the total weight of the graft copolymer (2).

6. A polymer blend as claimed in claim 3, wherein the graft copolymer (2) is a graft copolymer of polyvinyl chloride with butadiene and acrylonitrile in the proportions of 5:4:1 parts by weight respectively.

7. A polymer blend as claimed in claim 3, wherein the graft copolymer (2) is a graft copolymer of polyvinyl chloride with butadiene and methyl methacrylate in the proportions of 5:1:1 parts by weight respectively.

8. A polymer blend comprising a homogeneous mixture of (1) 100 parts by weight of polyvinyl chloride which has been further chlorinated in suspension under the influence of ultra-violet irradiation to give a product having a chlorine content in the range of 55 to 70% by weight and containing only a minor proportion of 1:1-dichloro-ethylene units based on the total weight of dichloro-ethylene units present, and (2) from 15 to 30 parts by weight of a graft copolymer of polyvinyl chloride with butadiene and acrylonitrile in the proportions of 5:4:1 parts by weight respectively.

References Cited by the Examiner
UNITED STATES PATENTS

| | | | |
|---|---|---|---|
| 2,802,809 | 8/57 | Hayes | 260—876 |
| 3,006,889 | 10/61 | Frey | 260—897 |
| 3,063,961 | 11/62 | Frank | 260—891 |

MURRAY TILLMAN, *Primary Examiner.*

LEON J. BERCOVITZ, *Examiner.*